(12) United States Patent
Ding (10) Patent No.: US 10,493,735 B2
(45) Date of Patent: Dec. 3, 2019

(54) PAPER CUP AND ITS MANUFACTURING PROCESS

(71) Applicant: Jiaoping Ding, Taizhou (CN)

(72) Inventor: Jiaoping Ding, Taizhou (CN)

( * ) Notice: Subject to any disclaimer, the term of this patent is extended or adjusted under 35 U.S.C. 154(b) by 147 days.

(21) Appl. No.: 15/628,574

(22) Filed: Jun. 20, 2017

(65) Prior Publication Data

US 2017/0361587 A1  Dec. 21, 2017

(30) Foreign Application Priority Data

Jun. 21, 2016 (CN) .......................... 2016 1 0453231

(51) Int. Cl.
| | | |
|---|---|---|
| *B65D 3/12* | (2006.01) | |
| *B32B 27/10* | (2006.01) | |
| *B29C 44/12* | (2006.01) | |
| *B65D 81/38* | (2006.01) | |
| *B29C 44/00* | (2006.01) | |
| *B32B 27/00* | (2006.01) | |

(52) U.S. Cl.
CPC .............. *B32B 27/10* (2013.01); *B29C 44/12* (2013.01); *B65D 3/12* (2013.01); *B65D 81/3865* (2013.01); *B29C 44/00* (2013.01); *B32B 27/00* (2013.01)

(58) Field of Classification Search
CPC .. B65D 3/22; B65D 81/3881; B65D 81/3869; B65D 81/3874; A47G 19/22; A47G 19/03; A47G 23/04
See application file for complete search history.

(56) References Cited

U.S. PATENT DOCUMENTS

| | | | | |
|---|---|---|---|---|
| 4,117,971 A | * | 10/1978 | Itoh .......................... | B65D 3/22 220/612 |
| 4,211,339 A | * | 7/1980 | Itoh .......................... | B05B 5/12 229/400 |
| 5,145,107 A | * | 9/1992 | Silver ...................... | B65D 3/22 229/4.5 |
| 5,226,585 A | * | 7/1993 | Varano ............... | A47G 19/2288 229/400 |
| 5,490,631 A | * | 2/1996 | Iioka ....................... | B29C 44/04 229/403 |
| 5,766,709 A | * | 6/1998 | Geddes .................... | B65D 3/14 220/902 |

(Continued)

FOREIGN PATENT DOCUMENTS

| | | |
|---|---|---|
| CN | 2618515 Y | 6/2004 |
| CN | 2749391 Y | 1/2006 |

(Continued)

*Primary Examiner* — Brian D Nash
(74) *Attorney, Agent, or Firm* — Minder Law Group; Willy H. Wong (57) ABSTRACT

The present paper cup comprises a cup body, and the cup body comprises inner paper and outer paper. There are hollow bulges on the outer paper, and the outer paper forms a connecting part. The inner side of the connecting part bonds to the outer side of the inner paper, and the cup rim of the outer paper extends to the cup rim of the inner paper. In addition, the outer side of the cup rim of the inner paper bonds to the inner side of the outer paper, and both cup rims of the outer paper and the inner paper bend outward to form a double layered crimping. The manufacturing process for the present paper cup includes: paper preparation, rolling, composition, sheet cutting, forming, molding and etc.

6 Claims, 7 Drawing Sheets

(56) References Cited

U.S. PATENT DOCUMENTS

| | | | | |
|---|---|---|---|---|
| 5,769,311 A * | 6/1998 | Morita | B31F 1/0051 | 220/592.17 |
| 5,839,653 A * | 11/1998 | Zadravetz | B65D 3/22 | 229/403 |
| 6,116,503 A * | 9/2000 | Varano | B65D 3/06 | 229/402 |
| 6,129,653 A * | 10/2000 | Fredricks | B29C 44/12 | 493/110 |
| 6,139,665 A * | 10/2000 | Schmelzer | B29C 44/12 | 156/78 |
| 6,142,331 A * | 11/2000 | Breining | B32B 5/18 | 220/62.12 |
| 6,598,786 B1 * | 7/2003 | Guo | B65D 81/3874 | 220/592.25 |
| 6,663,926 B1 * | 12/2003 | Okushita | B31F 1/0038 | 428/34.2 |
| 8,701,914 B1 * | 4/2014 | Buck | B65D 3/22 | 220/23.87 |
| 2002/0043555 A1 * | 4/2002 | Mader | B65D 3/04 | 229/400 |
| 2002/0172818 A1 * | 11/2002 | DeBraal | B29C 48/08 | 428/318.4 |
| 2002/0182347 A1 * | 12/2002 | DeBraal | B29C 44/12 | 428/34.2 |
| 2004/0105941 A1 * | 6/2004 | Terada | B65D 3/22 | 428/34.2 |
| 2004/0213930 A1 * | 10/2004 | Halabisky | B65D 81/3874 | 428/34.2 |
| 2005/0115975 A1 * | 6/2005 | Smith | B65D 81/3874 | 220/592.17 |
| 2006/0286325 A1 * | 12/2006 | Swoboda | B29C 44/12 | 428/36.5 |
| 2007/0084573 A1 * | 4/2007 | Bunker | B65D 81/3874 | 162/129 |
| 2007/0262129 A1 * | 11/2007 | Zadravetz | B31F 1/0038 | 229/403 |
| 2008/0041860 A1 * | 2/2008 | Wiedmeyer | B65D 81/3874 | 220/592.26 |
| 2008/0087715 A1 * | 4/2008 | Robertson | B65D 81/3869 | 229/403 |
| 2008/0121681 A1 * | 5/2008 | Wiedmeyer | B32B 1/02 | 229/403 |
| 2008/0128433 A1 * | 6/2008 | Stauffer | B65D 81/3869 | 220/592.17 |
| 2009/0020597 A1 * | 1/2009 | D'Amato | B65D 21/0233 | 229/403 |
| 2010/0108695 A1 * | 5/2010 | Zhang | B65D 1/265 | 220/592.26 |
| 2010/0196610 A1 * | 8/2010 | Chang | B29C 44/1271 | 427/379 |
| 2011/0174872 A1 * | 7/2011 | Hsieh | B65D 81/3869 | 229/403 |
| 2011/0272459 A1 * | 11/2011 | Hoekstra | B65D 25/205 | 229/400 |
| 2012/0241514 A1 * | 9/2012 | Guo | B65D 3/22 | 229/403 |
| 2012/0261427 A1 * | 10/2012 | Bates | B65D 81/3869 | 220/592.17 |
| 2012/0298733 A1 * | 11/2012 | Xu | B65D 3/22 | 229/124 |
| 2012/0318805 A1 * | 12/2012 | Leser | B65D 3/14 | 220/592.17 |
| 2012/0318806 A1 * | 12/2012 | Leser | A47G 19/2288 | 220/592.17 |
| 2013/0001289 A1 * | 1/2013 | Tedford | B65D 81/3874 | 229/403 |
| 2013/0175267 A1 * | 7/2013 | Ruan | B65D 3/06 | 220/62.11 |
| 2013/0292392 A1 * | 11/2013 | Cai et al. | B65D 81/3869 | 220/592.2 |
| 2013/0306630 A1 * | 11/2013 | Babinsky | B65D 81/3869 | 220/62.12 |
| 2014/0124518 A1 * | 5/2014 | Stahlecker | B65D 81/3876 | 220/739 |
| 2015/0083791 A1 * | 3/2015 | Gonzalez | B65D 81/3874 | 229/403 |
| 2015/0314944 A1 * | 11/2015 | D'Amato | B65D 3/06 | 229/403 |
| 2015/0360845 A1 * | 12/2015 | Stahlecker | B65D 21/0233 | 229/403 |
| 2016/0083570 A1 * | 3/2016 | Sun | C08L 23/12 | 252/62 |
| 2016/0107786 A1 * | 4/2016 | Lin | B65D 81/3874 | 156/227 |
| 2016/0194138 A1 * | 7/2016 | Saitaka | B65D 81/3874 | 229/403 |
| 2016/0296049 A1 * | 10/2016 | Chu | B65D 81/3874 | |
| 2018/0016052 A1 * | 1/2018 | Tomioka | B65D 3/22 | |
| 2018/0370666 A1 * | 12/2018 | Garza | B65B 11/02 | |

FOREIGN PATENT DOCUMENTS

| | | |
|---|---|---|
| CN | 1847101 A | 10/2006 |
| CN | 2843254 Y | 12/2006 |
| CN | 1961786 A | 5/2007 |
| CN | 101028874 A | 9/2007 |
| CN | 201042346 Y | 4/2008 |
| CN | 201438915 U | 4/2010 |
| CN | 101798000 A | 8/2010 |
| CN | 201743403 U | 2/2011 |
| CN | 202184526 U | 4/2012 |
| CN | 202365482 U | 8/2012 |
| CN | 202553309 U | 11/2012 |
| CN | 202636473 U | 1/2013 |
| CN | 202941822 U | 5/2013 |
| CN | 204158131 U | 2/2015 |
| CN | 204292773 U | 4/2015 |
| CN | 204600086 U | 9/2015 |
| CN | 204654483 U | 9/2015 |

* cited by examiner

PAPER CUP AND ITS MANUFACTURING PROCESS

RELATED APPLICATIONS

This application claims benefit to Chinese Patent Application No. CN201610453231.7, filed Jun. 21, 2016.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention pertains to the technical field of paper containers, and particularly to a paper cup and its manufacturing process.

Related Art

A paper cup is a paper container fabricated by machining and bonding base paper made from chemical wood pulps. Existing technology of anti-scald paper cups is to sleeve an anti-scald layer, made of single layered paper with recessed or raised patterns pressed on it, over the inner cup made of single layered paper. There is also a corrugated anti-scald layer, where the face paper shrinks in proportion after being heated, and is molded and composited to the lining paper. It is then cut horizontally for wrapping around the paper cup to achieve the anti-scald effect.

One prior art paper cup comprises the cup body, cup bottom and the cup sleeve. The key point is that there is a cup sleeve sleeved over the cup body. The cup sleeve is made of corrugated paper. The corrugation strips are arranged horizontally, or recessed slots are set on the horizontally arranged corrugation strips. The manufacturing process is divided into two sub-processes of fabricating paper cup and fan-shaped sheet for corrugated paper cup sleeve, as well as an assembly process of cup sleeve fitting. The fan-shaped sheet for corrugated paper cup sleeve is rolled and molded by molds of the cup sleeve fitting machine. The joints are heat bonded by instantaneous ultrasonic heating, forming the corrugated paper cup sleeve. The inner wall is coated with glue and bonded to the paper cup. The crimping of the paper cup is single layered, and the strength is weak. In addition, the manufacturing process of fitting the cup sleeve over the cup body leads to a low bonding strength between the two parts. Hence, the supporting effect of the corrugations may fail when subjected to forces in use. However, the supporting strength of the paper cup when held in hand mainly comes from the crimping on the top. Therefore, this paper cup needs to thicken the paper sheet to remedy the defect of low strength. For this purpose, the weights of paper used for the cup body and the cup sleeve reaches 300 grams per square meter, and the manufacturing cost is relatively high. Moreover, the disadvantages of this manufacturing process also involves the addition of the die cutting and molding processes, the addition in the cost and thickness of the paper used for the anti-scald layer. They lead to a greater height when paper cups are stacked, increasing the volume, and costs of packaging, storage and transportation.

SUMMARY OF THE INVENTION

One objective of one embodiment of the present invention is to avoid the issues stated above in the prior art, and to provide a kind of paper cup. The paper cup has a fairly good strength and anti-scald effect.

Another objective of one embodiment of the present invention is to avoid the issues stated above in the prior art, and to provide a manufacturing process for paper cups. The manufacturing process can produce paper cups of a fairly good strength and anti-scald effect.

Another objective of one embodiment of the present invention can be achieved by the following technical proposal:

A paper cup comprises a cup body, and the cup body comprises inner paper and outer paper. It is characterized in that:

Both of the inner paper and the outer paper are single layered paper. On the outer paper, there are several hollow bulges which projects outward and is used for an anti-scald purpose. Part of the outer paper locating in between two adjacent hollow bulges forms a connecting part. The inner side of the connecting part bonds to the outer side of the inner paper, the cup rim of the outer paper extends to the cup rim of the inner paper, and the outer side of the cup rim of the inner paper bonds to the inner side of the cup rim of the outer paper. Both of the cup rims of the outer paper and the inner paper bend outward to form a double layered crimping, and the cross section of the crimping is annular. A cup bottom is fixed to the bottom part of the cup body.

The outer paper is bended into orderly arranged hollow bulges, and an integrated double layered structure is formed after the inner side of the connecting part bonds to the outer side of the inner paper, taking a role in increasing the supporting strength. The air in two adjacent hollow bulges is isolated and does not communicate with each other. When the paper cup is held in hand, the hand presses against the outer surface of the hollow bulges. At this point, the inner cavity of the hollow bulge insulates the heat transfer, making the heat not transfer to the outer surface of the hollow bulges, and hence it has a fairly good anti-scald effect. Further, since the hand presses against the hollow bulges when the cup body is held in hand, the hollow bulges play a role in strengthening the stiffness, presenting a fairly good supporting effect to the cup body. At the same time, the hollow bulges and the connecting parts are arranged alternately, making the strengthening effects of both the connecting parts and the hollow bulges distributed evenly along height of the cup body. This combination further improves the strength of the cup body. Still further, since the lower end of the cup body is supported by the cup bottom, and the cup mouth at the upper end is annular, the rim of the cup body bends outward to form a crimping of a double layered paper structure. The crimping also plays a role as stiffener, so as to improve the strength of the cup rim and prevent the cup rim from collapsing inward to deform the cup body. Therein, the inner paper of the crimping bonds to the outer paper, so the inner paper integrates with the outer paper, and it has a relatively high supporting strength. For environmental protection and anti-scald effect, we can use bleached or non-bleached plant fiber, such as reed, sugar cane, wheat straw, bamboo, straw pulp, bamboo pulp and so on.

In one embodiment of the paper cup, the connecting part is in an annular or a continuous strip shape, and the width of the connecting part is 1 mm-12 mm. The connecting part is annular, allowing the hollow bulges to be annular. When the cup body is held in hand, the cup body is subjected to radial forces. Therefore, the hollow bulges are arranged around the inner paper. Each hollow bulge can bear certain radial forces. Combined with the arrangement along height of the cup body, multiple hollow bulges have a relatively high supporting strength to the cup body. There is a certain connecting area between the connecting part and the inner paper. The connecting area strengthens the connection strength between the outer paper and the inner paper, as well as the supporting strength of the cup body. When the connecting part is in a continuous strip shape, the hollow bulge may also be in a continuous strip shape. Similarly, a relatively good supporting strength is also ensured.

In one embodiment of the paper cup, the weights of the outer paper and the inner paper are both 100 grams per square meter-170 grams per square meter. Since hollow bulges are evenly arranged on the cup body, and the crimping uses a bonded double layered paper structure, the cup body has a relatively high supporting strength. Therefore, the thicknesses of the inner paper and the outer paper can be reduced. Namely, the weights of both of the inner paper and the outer paper can be reduced to 100 grams per square meter-170 grams per square meter. This saves the paper usage, is more environment friendly and reduces the production cost.

In one embodiment of the paper cup, the outer rim of the cup bottom bends downward to form a supporting flange. The bottom rim of the cup body bends inward, and the inner side of the inner paper bonds to the inner side of the supporting flange. The main purpose of the supporting flange is to support the cup body, but it can also improve the strength of the cup bottom. The lower end of the cup body can be bended inward to wrap the supporting flange. Namely, the structure supporting the cup body is a five-layer-paper structure: the inside and outside layers of outer paper, the inside and outside layers of inner paper, and the supporting flange. This has a relatively strong supporting effect. Further, the upper edge or the outer paper bends and hides in the inside of the crimping, while the lower edge bends and hides in the inside of the supporting flange. Therefore, the upper and lower edges of the outer paper will not detach from the inner paper due to external forces, while in use. This eliminates the initiation of the outer paper detaching from the inner paper, and makes the bonding stability of the outer paper and the inner paper better.

As an alternative, the connecting part is in the form of a strip and/or a block; and a plurality of connecting parts are arranged on the outer side surface of the paper cup to form a decorative design, and the width of the connecting part is 1 mm to 12 mm. By means of the stripes and/or blocks of the connecting part and the different widths of the connecting part, a variety of drawing elements can be provided to the cup face, such as the design of the palm trees, which can be presented through bars and blocks of variable widths. Conversely, the design can be rendered by swapping the roles of connecting part with the hollow bulge.

A manufacturing process for one embodiment of paper cups is characterized in comprising the following steps:

A. Paper Preparation: Wind the outer paper into a reel, and wind the inner paper into a reel too. Therein, the weights of the outer paper and the inner paper are both 100 grams per square meter-170 grams per square meter.

B. Rolling: Unwind the outer paper and roll several embossed patterns onto the outer paper.

C. Composition: Bond one side of the rolled outer paper to the side of the inner paper to form double layered paper, such that the embossed patterns on the other side of the outer paper form the hollow bulges.

D. Sheet Cutting: Unfold the double layered paper and die cut into fan-shaped cup sheets with two opposite straight edges and two opposite arc edges.

E. Forming: Wind the cup sheet into a cup body which is cylindrical but with diameter tapering from top to bottom, then bond the two straight edges of the cup sheet, and then bend the cup rim of the double layered paper outward to form a crimping with an annular cross section.

F. Molding: Bend the bottom rim of the cup body inward and adhere it to the inner side of the supporting flange of the cup bottom by hot pressing.

In one embodiment of the process, the weights of the inner paper and the outer paper are limited within 100 grams per square meter-170 grams per square meter, so as to save the paper usage and reduce the production cost. Regarding the issue of insufficient strength resulting from the reduction of the paper usage, several embossed patterns are rolled on the outer paper, and then the outer paper and the inner paper are bonded together before being wound into the cylindrical cup body. Hence, hollow bulges having a relatively high supporting strength are formed to improve the supporting strength of the cup body. Compared to the conventional process, where the outer paper is wound into a cylindrical outer cup body, the inner paper is wound into a cylindrical inner cup body, and then the outer cup body is sleeved over and bonded to the inner cup body, in the process, the inner paper is first bonded with the outer paper having embossed patterns, so as to ensure a fairy good integrity of the inner paper and the outer paper before they are wound into the cylindrical cup body. In addition, the connection quality is better when unrolled outer paper is bonded to the unrolled inner paper, which eliminates local voids due to insufficient bonding strength or some other reasons. Then, double layered paper with a better connection quality and connection stability is wound into cylindrical cup body, so that the cup body has a relatively high supporting strength. Further, in the process, the bonded double layered paper is bended and crimped. The crimping also plays a role as stiffener, so as to improve the strength of the cup rim and prevent the cup rim from collapsing inward to deform the cup body. Therein, both of the inner paper and the outer paper of the crimping are mutually bonded, so this can avoid the deformation of one layer of paper leading to the deformation of the other layer of paper. The inner paper and the outer paper are integrated and have a relatively high supporting strength. Still further, since the connection quality between the inner paper and the outer paper is relatively high, the hollow bulges will not collapse inward to touch the inner paper when subjected to forces. Therefore, when the cup body is held in hand, the hollow bulges can always provide stable insulation space, ensuring a fairly good anti-scald effect.

In the manufacturing process for one embodiment of the paper cup, in step B, the outer paper passes through the meshed convex roller and concave roller. When the convex roller and the concave roller roll the outer paper, the temperature of the outer paper is lower than 90° C., and the moisture content of the outer paper is 5.5%-7%. After rolling, the height of the embossed patterns on the outer paper is 0.3 mm-1 mm. The rolled outer paper adheres to the concave roller and rotates with the concave roller to get to the other side of the concave roller and proceed to step C. In this process, when the outer paper is subjected to the pressure from the convex roller and the concave roller and deforms, the temperature and humidity of the outer paper determines the extent and stability of the outer paper deformation. Within the ranges of the temperature and humidity listed above, the embossed patterns rolled on the outer paper are of higher quality. Here, the height of the embossed patterns will affect the height of the hollow bulges after the outer paper is bonded to the inner paper in Step C, and further affects the supporting strength and anti-scald effect of the cup body. Depending on the pattern on the convex roller and the concave roller, different patterns can be embossed.

In the manufacturing process for one embodiment of the paper cup, in step C, the outer paper adheres to the outer side of the concave roller, and the inner paper adheres to the outer side of the round roller. The outer paper and the inner paper approach and abut to each other. Therein, before the outer paper abut on the inner paper, the spraying head is located above the gap between the concave roller and the round roller, and film coat the opposite sides of the outer paper and the inner paper simultaneously; or the gluing head is located above the gap between the concave roller and the round roller, and glue coat the opposite sides of the outer paper and the inner paper simultaneously. Driven by the concave roller and the round roller respectively, the outer paper and the inner paper approach. Before they abut on each other, adhesive needs to be added. There are various means to bond the outer paper and the inner paper, and typical options are bonded through film coating or glue coating. When the bonding through film coating is used, a film coating machine is needed. The film coating head of the film coating machine is placed over the gap between the concave roller and the round roller, so the sides of both outer paper and the inner paper have film coating before they abut on each other. Then they are bonded under force, allowing the outer paper and the inner paper to have a relatively high connection strength and stability. Similarly, when the bonding through glue coating is used, a glue coating machine is needed. The gluing head of the glue coating machine is placed over the gap between the concave roller and the round roller, so the sides of both outer paper and the inner paper have glue coating before they abut on each other. Then they are bonded under force, allowing the outer paper and the inner paper to have a relatively high connection strength and stability. Hence, the supporting strength and anti-scald effect of the cup body is provided.

In the manufacturing process for one embodiment of the paper cup, in step C, when the outer paper is bonded to the inner paper through glue coating, the amount of glue usage is 5 grams per square meter-15 grams per square meter. When the outer paper is bonded to the inner paper through film coating, the thickness of the film coating is 0.007 mm-0.018 mm. The amount of the glue usage, when bonding through glue coating is selected, determines the connection strength between the outer paper and the inner paper. Excessive glue results in overflow of the glue and waste of the glue, while inadequate glue results in insufficient connection strength. Similarly, the thickness of the film coating, when bonding through film coating is selected, determines the connection strength between the outer paper and the inner paper. Too thick film coating wastes the film coating, while too thin film coating results in insufficient connection strength.

In the manufacturing process for one embodiment of the paper cup, in step C, the round roller is a rubber roller with Shore hardness of 45-95. The pressure of the round roller and the concave roller against the outer paper and the inner paper is 40 N-80 N, making one side of the outer paper locally smoothened and adhered to the side of the inner paper, and hence the connecting part located between the adjacent hollow bulges is formed. The width of the connecting part is 4 mm-12 mm. The pressures against the outer paper and the inner paper from the round roller and the concave roller affect the connection strength between the outer paper and the inner paper. Namely, when the pressure is too big, the adhesive between the outer paper and the inner paper is squeezed out, resulting in insufficient connection strength; when the pressure is too small, voids are prone to occur between the outer paper and the inner paper, resulting in insufficient connection strength. Correspondingly, the bonding surface area intuitively reflects the connection strength between the outer paper and the inner paper, while the height of the hollow bulge intuitively reflects the size of the insulation cavity. When the width of the bonding surface is bigger and the inner cavity of the hollow bulge is smaller, the heat insulation effect is reduced. Considering the factors comprehensively, when the width of the bonding surface is set to 4 mm-12 mm, the connection strength between the outer paper and the inner paper is relatively high and the heat insulation effect is relatively good.

In the manufacturing process for one embodiment of the paper cup, in step B, the rolled embossed patterns are uniformly distributed on the outer paper. Between step C and D, the outer paper is flattened with a hot press plate, so as to form several groups of embossed patterns. Each group of embossed patterns is arranged in a fan-shaped pattern. First the outer paper is locally pressed and flattened by the hot press plate, so as to form several groups of embossed patterns, and then in Step D, several groups of embossed patterns are die cut. Each group of embossed patterns corresponds to a cup sheet, and the flattened part pressed by the hot press plate forms the smooth edges of the cup sheet, which are used for the crimping to wrap the supporting flange. The straight edges of the cup sheet are flattened and used to be wound into a cylinder and then bonded.

In the manufacturing process for one embodiment of the paper cups, in step B, the concave roller and the convex roller roll several groups of embossed patterns arranged with orderly spacing onto the outer paper, making the area between two adjacent embossed patterns flat. In step D, a fan-shaped cup sheet containing one group of embossed patterns is die cut, and the edges of the cup sheet are smooth. The double layered paper of this structure reserves a flat part between each group of embossed patterns, so the die cut fan-shaped cup sheet has smooth edges, and it does not need to be pressed and flattened before it is wound into the cup body.

Compared to the prior art, one embodiment of the paper cup and its manufacturing process have the following advantages:

1. When the paper cup is held in hand, the hand presses against the outer surface of the hollow bulges. At this point, the inner cavity of the hollow bulge insulates the heat transfer, making the heat not transfer to the outer surface of the hollow bulges, and hence it has a fairly good anti-scald effect.

2. Since rims of the ends of the cup body are bended outward to form the crimping of a double layered paper structure, both of the inner paper and the outer paper of the crimping are mutually bonded, so this can avoid the deformation of one layer of paper leading to the deformation of the other layer of paper. The inner paper and the outer paper are integrated and have a relatively high supporting strength.

3. In the process, the inner paper is first bonded with the outer paper having embossed patterns, so as to ensure a fairy good integrity of the inner paper and the outer paper before they are wound into the cylindrical cup body. Then, double layered paper with a better connection quality and connection stability is wound into cylindrical cup body, so that the cup body has a relatively high supporting strength. Therefore, the weights of the inner paper and the outer paper can be limited within 100 grams per square meter-170 grams per square meter, so as to save the paper usage and reduce the production cost.

DETAILED DESCRIPTION OF THE INVENTION

The embodiments of this invention will be described below and the technical solutions of the invention will be further illustrated in connection with the accompanying figures. However, the present invention shall not be limited to these embodiments.

First Embodiment

Figure 1:
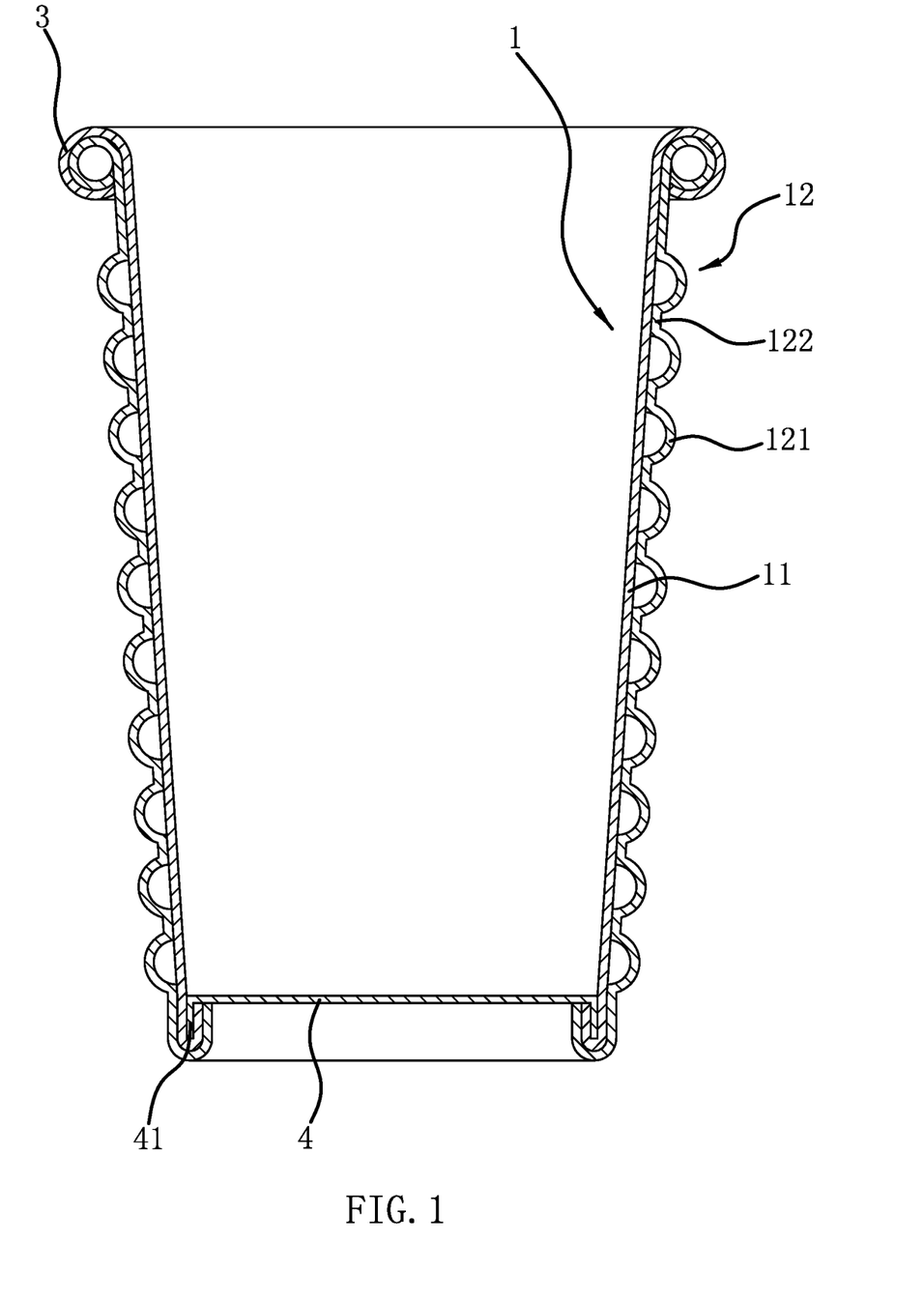
FIG. 1 is a sectional view of one embodiment of the paper cup.

As shown in FIG. 1, a paper cup comprises a cup body (1), and the cup body (1) comprises inner paper (11) and outer paper (12). Both of the inner paper (11) and the outer paper (12) are single layered paper. On the outer paper (12), there are several hollow bulges (121) which projects outward and is used for an anti-scald purpose. Part of the outer paper (12) locating in between two adjacent hollow bulges (121) forms a connecting part (122). The inner side of the connecting part (122) bonds to the outer side of the inner paper (11), the cup rim of the outer paper (12) extends to the cup rim of the inner paper (11), and the outer side of the cup rim of the inner paper (11) bonds to the inner side of the cup rim of the outer paper (12). Both of the cup rims of the outer paper (12) and the inner paper (11) bend outward to form a double layered crimping (3), and the cross section of the crimping is annular. The outer paper (12) is bended into orderly arranged hollow bulges (121). After the inner side of the connecting part (122) is bonded to the outer side of the inner paper (11), the air in two adjacent hollow bulges (121) is isolated and does not communicate with each other. When the cup body (1) is held in hand, the hand presses against the outer surface of the hollow bulges (121). At this point, the inner cavity of the hollow bulge (121) insulates the heat transfer, making the heat not transfer to the outer surface of the hollow bulges (121), and hence it has a fairly good anti-scald effect. Further, since the hand presses against the hollow bulges (121) when the cup body (1) is held in hand, the hollow bulges (121) plays a role in strengthening the stiffness, presenting a fairly good supporting effect to the cup body (1), and hence improve the strength of the cup body (1). Still further, since the lower end of the cup body (1) is supported by the cup bottom (4), and the cup mouth on the upper end is annular, the rim of the cup body (1) bends outward to form a crimping (3) of a double layered paper structure. The crimping (3) also plays a role as stiffener, so as to improve the strength of the cup rim of the cup body (1) and prevent the cup rim from collapsing inward to deform the cup body (1). Therein, the inner paper (11) of the crimping (3) bonds to the outer paper (12), so the inner paper (11) integrates with the outer paper (12), and it has a relatively high supporting strength.

Specifically, when the cup body (1) is held in hand, the cup body (1) is subjected to radial forces. Therefore, the connecting part (122) is annular and arranged around the inner paper (11). In addition, several connecting parts (122) are arranged along the height of the cup body (1). Namely, the hollow bulge (121) is annular and each hollow bulge (121) can bear certain radial forces. Combined with the arrangement along height of the cup body (1), multiple hollow bulges (121) have a relatively high supporting strength to the cup body (1). The width of the connecting part (122) is 8 mm. There is a certain connecting area between the connecting part (122) and the inner paper (11). The connecting area strengthens the connection strength between the outer paper (12) and the inner paper (11), as well as the supporting strength of the cup body (1). Of course, during the actual manufacturing process, the connecting part (122) may be in a continuous strip shape, making the hollow bulge (121) be in a continuous strip shape too, or making the hollow bulge (121) be in a round or polygon shape. All of them have a relatively good supporting strength. Since hollow bulges (121) are evenly arranged on the cup body (1), and the crimping (3) uses a bonded double layered paper structure, the cup body (1) has a relatively high supporting strength. Therefore, the thicknesses of the inner paper (11) and the outer paper (12) can be reduced. Namely, the weights of both of the inner paper (11) and the outer paper (12) can be reduced to 130 grams per square meter. This saves the paper usage, is more environment friendly and reduces the production cost. The outer rim of the cup bottom (4) bends downward to form a supporting flange (41). The bottom rim of the cup body (1) bends inward, and the inner side of the inner paper (11) bonds to the inner side of the supporting flange. The main purpose of the supporting flange (41) is to support the cup body (1), but it can also improve the strength of the cup bottom (4). The lower end of the cup body (1) can be bended inward to wrap the supporting flange (41). Namely, the structure supporting the cup body is a five-layer-paper structure: the inside and outside layers of outer paper (12), the inside and outside layers of inner paper (11), and the supporting flange (41). This has a relatively strong supporting effect.

Figure 2:
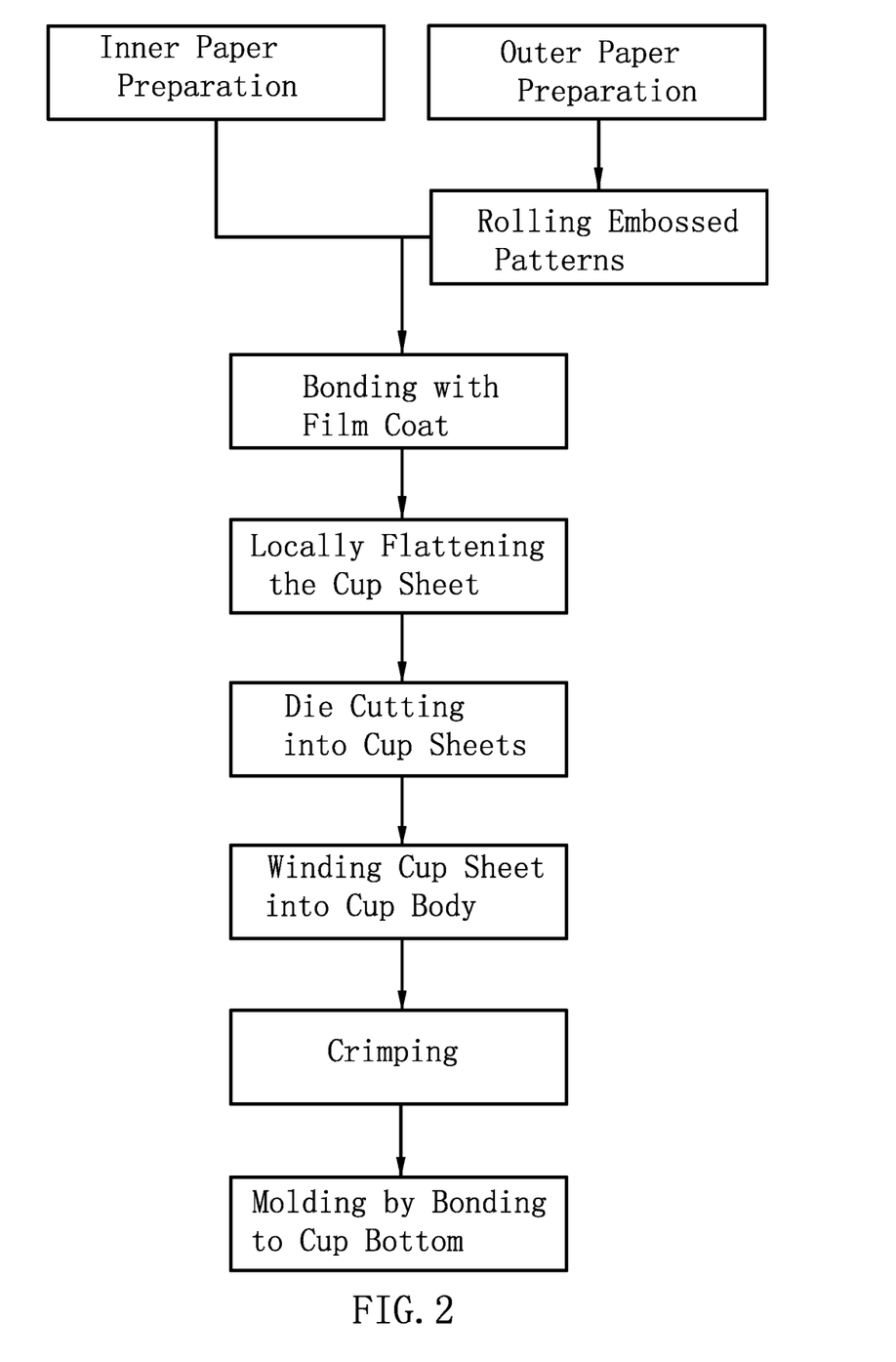
FIG. 2 is a flow chart of the manufacturing process for one embodiment of the paper cup.
Figure 4:
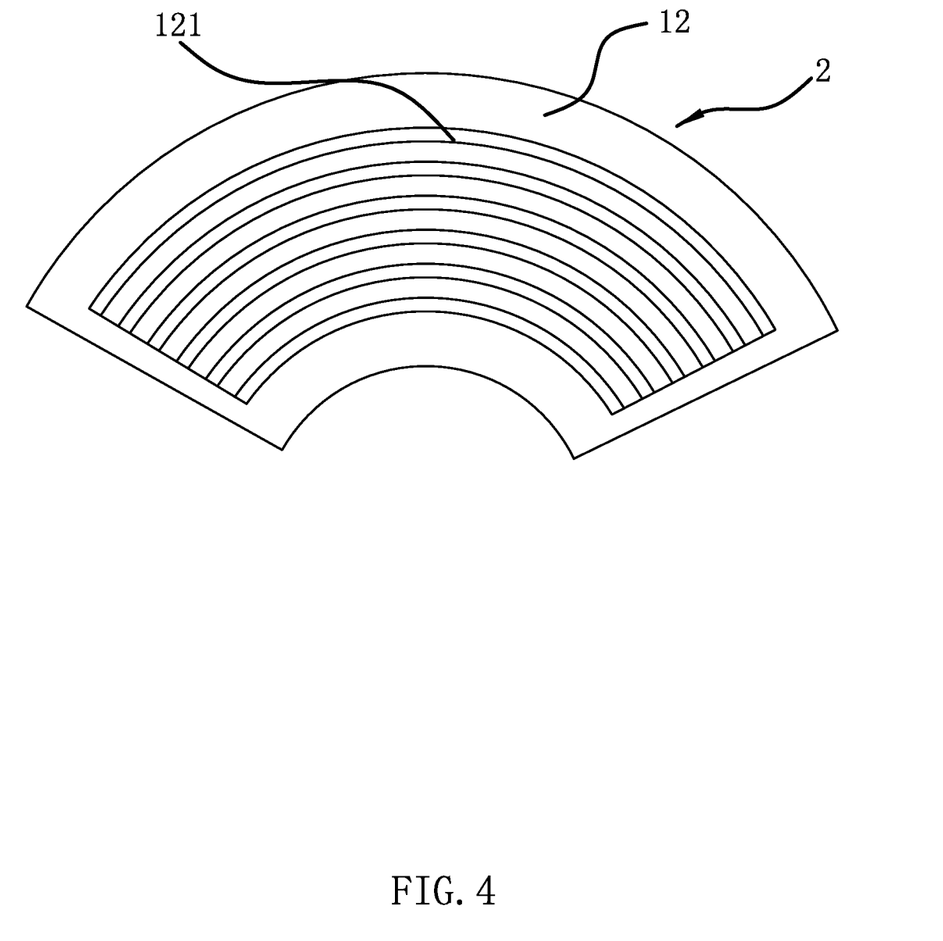
FIG. 4 is a schematic view of one embodiment of the cup sheet.
Figure 5:
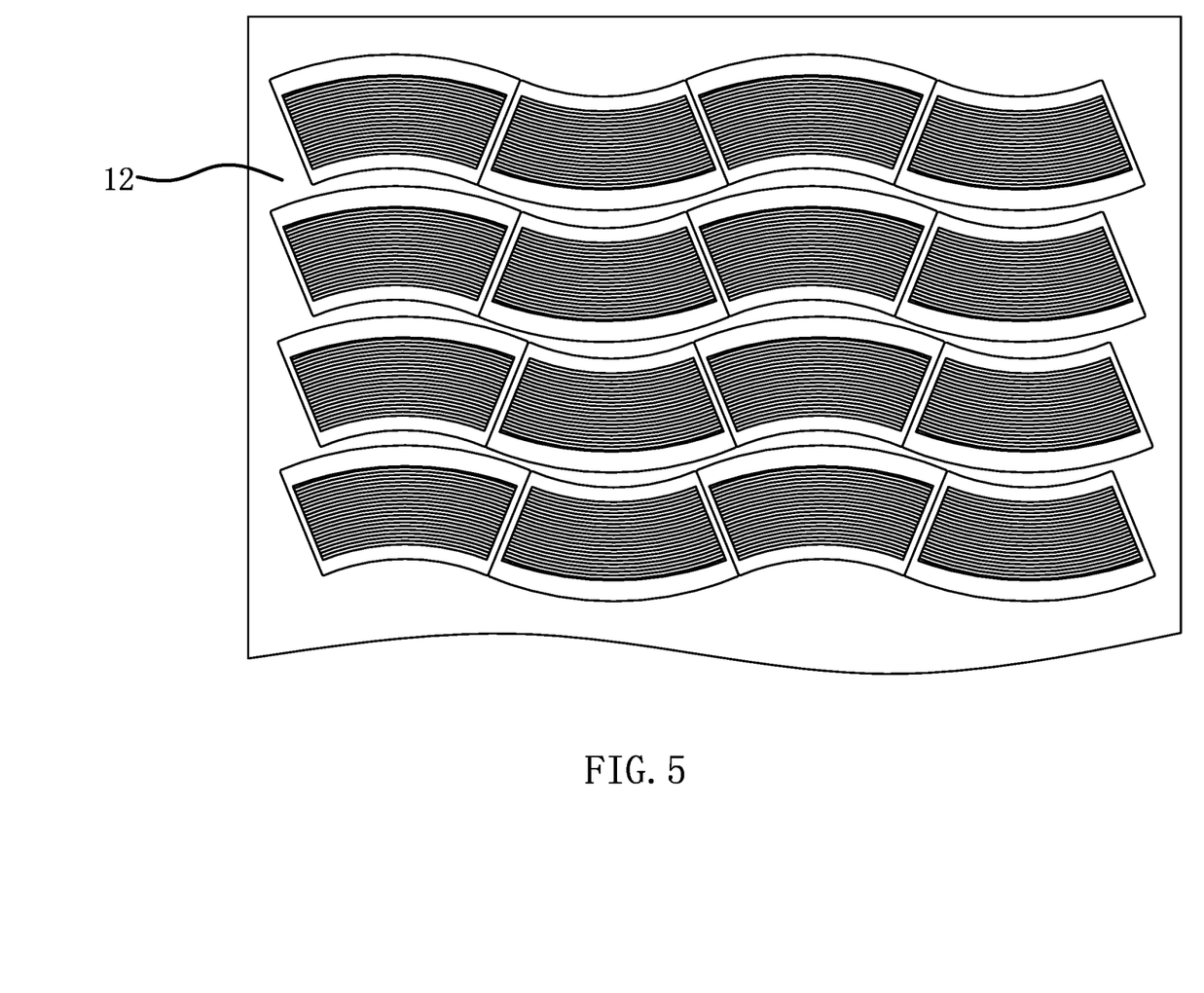
FIG. 5 is a schematic view of one embodiment of the double layered paper that is not die cut yet in the second embodiment.

As shown in FIG. 2, FIG. 4 and FIG. 5, the manufacturing process for the paper cup is characterized in comprising the following steps:

A. Paper Preparation: Wind the outer paper (12) into a reel, and wind the inner paper (11) into a reel too. Therein, the weights of the outer paper (12) and the inner paper (11) are both 130 grams per square meter.

B. Rolling: Unwind the outer paper (12) and roll several embossed patterns onto the outer paper (12).

C. Composition: Bond one side of the rolled outer paper (12) to the side of the inner paper (11) to form double layered paper (9), such that the embossed patterns on the other side of the outer paper (12) form the hollow bulges (121).

D. Sheet Cutting: Unfold the double layered paper and die cut into fan-shaped cup sheets with two opposite straight edges and two opposite arc edges.

E. Forming: Wind the cup sheet (2) into a cup body (1) which is cylindrical but with diameter tapering from top to bottom, then bond the two straight edges of the cup sheet (2), and then bend the cup rim of the double layered paper (9) outward to form a crimping (3) with an annular cross section.

F. Molding: Bend the bottom rim of the cup body (1) inward and adhere it to the inner side of the supporting flange (41) of the cup bottom (4) by hot pressing.

In one embodiment of the process, the weights of the inner paper (11) and the outer paper (12) are limited to 130 grams per square meter, so as to save the paper usage and reduce the production cost. Regarding the issue of insufficient strength resulting from the reduction of the paper usage, several embossed patterns are rolled on the outer paper (12), and then the outer paper (12) and the inner paper (11) are bonded together before being wound into the cylindrical cup body (1). Hence, hollow bulges (121) having a relatively high supporting strength are formed to improve the supporting strength of the cup body (1). Compared to the conventional process, where the outer paper (12) is wound into a cylindrical outer cup body, the inner paper (11) is wound into a cylindrical inner cup body, and then the outer cup body is sleeved over and bonded to the inner cup body, in the process, the inner paper (11) is first bonded with the outer paper (12) having embossed patterns, so as to ensure a fairy good integrity of the inner paper (11) and the outer paper (12) before they are wound into the cylindrical cup body (1). In addition, the connection quality is better when the unrolled outer paper (12) is bonded to the unrolled inner paper (11), which eliminates local voids due to insufficient bonding strength or some other reasons. Then, double layered paper (9) with a better connection quality and connection stability is wound into cylindrical cup body (1), so that the cup body (1) has a relatively high supporting strength. Therein, the two edges of the cup sheet (2) are bonded after it is wound. The seaming line may be along the axis o the cup body (1), and of course, may be inclined relative to it. Further, in the process, the bonded double layered paper (9) is bended to form the crimping (3). The crimping (3) also plays a role as stiffener, so as to improve the strength of the cup rim of the cup body (1) and prevent the cup rim from collapsing inward to deform the cup body (1). Therein, both of the inner paper (11) and the outer paper (12) of the crimping (3) are bonded, so this can avoid the deformation of one layer of paper due to the deformation of the other layer of paper. The inner paper (11) and the outer paper (12) are integrated and have a relatively high supporting strength. Still further, since the connection quality between the inner paper (11) and the outer paper (12) is relatively high, the hollow bulges (121) will not collapse inward to touch the inner paper (11) when subjected to forces. Therefore, when the cup body (1) is held in hand, the hollow bulges (121) can always provide stable insulation space, ensuring a fairly good anti-scald effect.

Figure 3:
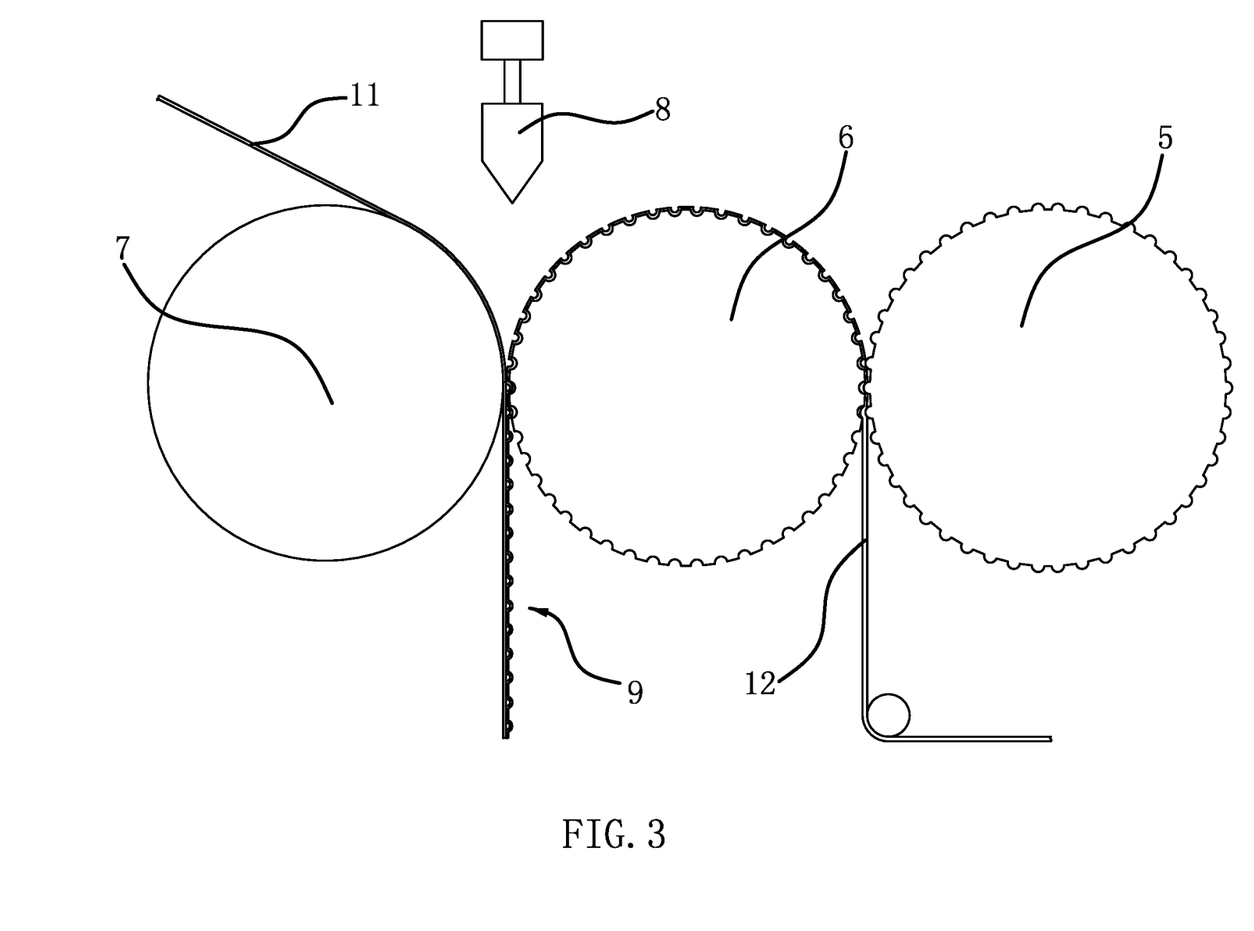
FIG. 3 is a simplified flow chart of Steps B and C.

Specifically, as shown in FIG. 3, in step B, the outer paper (12) passes through the meshed convex roller (5) and concave roller (6). When the outer paper (12) is subjected to the pressure from the convex roller (5) and the concave roller (6) and deforms, the temperature and humidity of the outer paper (12) determines the extent and stability of the outer paper (12) deformation. Therefore, in this embodiment, when the convex roller (5) and the concave roller (6) roll the outer paper (12), the temperature of the outer paper (12) is 85° C., and the moisture content of the outer paper (12) is 6.25%, making the quality of the embossed patterns rolled on the outer paper (12) higher. The height of the embossed patterns on the outer paper (12) is 0.7 mm-1 mm. Here, the height of the embossed patterns will affect the height of the hollow bulges (121) after the outer paper (12) is bonded to the inner paper (11) in Step C, and further affects the supporting strength and anti-scald effect of the cup body (1). The rolled outer paper (12) adheres to the concave roller (6) and rotates with the concave roller (6) to get to the other side of the concave roller (6) and proceed to step C. In step C, the outer paper (12) adheres to the outer side of the concave roller (6), and the inner paper (11) adheres to the outer side of the round roller (7). The outer paper (12) and the inner paper (11) approach and abut to each other. Therein, before the outer paper (12) abuts on the inner paper (11), they need to be film coated with a film coating machine. The spraying head (8) of the film coating machine is placed above the gap between the concave roller (6) and the round roller (7), so the sides of both outer paper (12) and the inner paper (11) have film coating before they abut on each other. Then they are bonded under force, allowing the outer paper (12) and the inner paper (11) to have a relatively high connection strength and stability. In Step C, the round roller (7) and the concave roller (6) make one side of the outer paper (12) locally unrolled and bonded to the side of the inner paper (11), hence forming the connecting part (122) located between two adjacent hollow bulges (121). The pressures against the outer paper (12) and the inner paper (11) from the round roller (7) and the concave roller (6) affect the connection strength between the outer paper (12) and the inner paper (11). Namely, when the pressure is too big, the adhesive between the outer paper (12) and the inner paper (11) is squeezed out, resulting in insufficient connection strength; when the pressure is too small, voids are prone to occur between the outer paper (12) and the inner paper (11), resulting in insufficient connection strength. Correspondingly, the bonding surface area intuitively reflects the connection strength between the outer paper (12) and the inner paper (11), while the height of the hollow bulge (121) intuitively reflects the size of the insulation cavity. When the width of the bonding surface is bigger and the inner cavity of the hollow bulge (121) is smaller, the heat insulation effect is reduced. Considering the factors comprehensively, in this embodiment, when the width of the bonding surface is set to 8 mm, the connection strength between the outer paper (12) and the inner paper (11) is relatively high and the heat insulation effect is relatively good. The thickness of the film coating, when bonding through film coating is selected, determines the connection strength between the outer paper (12) and the inner paper (11). Too thick film coating wastes the film coating, while too thin film coating results in insufficient connection strength. Therefore, in this embodiment, the thickness of the film coating when the outer paper (12) and the inner paper (11) are bonded with film coating is 0.012 mm. In step B, the rolled embossed patterns are uniformly distributed on the outer paper (12). Between steps C and D, the outer paper (12) is pressed and flattened with a hot press plate, so as to form several groups of embossed patterns. Each group of embossed patterns is arranged in a fan-shaped pattern. First the outer paper (12) is locally pressed and flattened with a hot press plate, so as to form several groups of embossed patterns, and then in Step D, several groups of embossed patterns are die cut. A group of embossed patterns corresponds to a cup sheet (2), and the flattened part pressed by the hot press plate forms the smooth edges of the cup sheet (2).

Second Embodiment

The manufacturing process for the paper cup of this embodiment is basically the same as that of the first embodiment. The differences are:

In step B, the concave roller (6) and the convex roller (5) roll several groups of embossed patterns arranged with orderly spacing onto the outer paper (12), making the area between two adjacent embossed patterns flat. In step D, a fan-shaped cup sheet (2) containing one group of embossed patterns is die cut, and the edges of the cup sheet (2) is smooth.

Third Embodiment

The manufacturing process for the paper cup of this embodiment is basically the same as that of the first embodiment. The differences are:

In Step A, the weights of the outer paper (12) and the inner paper (11) are both 100 grams per square meter.

In step B, when the convex roller (5) and the concave roller (6) roll the outer paper (12), the temperature of the outer paper (12) is 80° C., and the moisture content of the outer paper (12) is 5.5%. After rolling, the height of the embossed patterns on the outer paper (12) is 0.3 mm.

In step C, the pressure of the round roller (7) and the concave roller (6) against the outer paper (12) and the inner paper (11) is 40 N, and the width of the connecting part is 1 mm. When the outer paper (12) is bonded to the inner paper (11) with film coating, the thickness of the film coating is 0.007 mm.

Fourth Embodiment

The manufacturing process for the paper cup of this embodiment is basically the same as that of the first embodiment. The differences are:

In Step A, the weights of the outer paper (12) and the inner paper (11) are both 170 grams per square meter.

In step B, when the convex roller (5) and the concave roller (6) roll the outer paper (12), the temperature of the outer paper (12) is 75° C., and the moisture content of the outer paper (12) is 7%. After rolling, the height of the embossed patterns on the outer paper (12) is 1 mm.

In step C, the pressure of the round roller (7) and the concave roller (6) against the outer paper (12) and the inner paper (11) is 80 N, and the width of the connecting part is 12 mm. When the outer paper (12) is bonded to the inner paper (11) with film coating, the thickness of the film coating is 0.018 mm.

The embodiments stated above select 3 combinations of process parameters. Of course, other combinations are also applicable.

Fifth Embodiment

Figure 6:
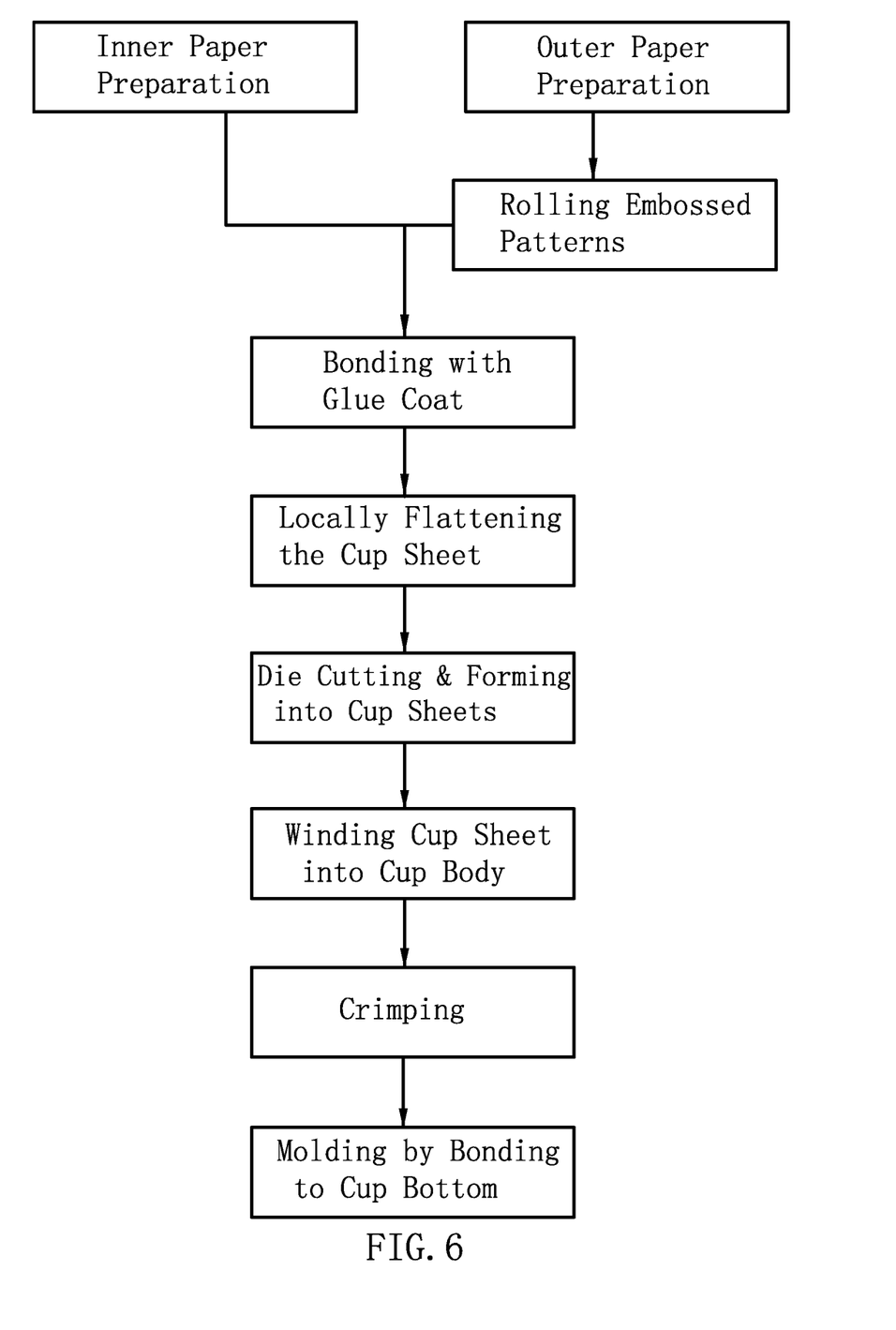
FIG. 6 is a flow chart of the manufacturing process for the paper cup in the fifth embodiment.

The manufacturing process for the paper cup of this embodiment is basically the same as that of the first embodiment. The differences are:

As shown in FIG. 6, in step C, the outer paper (12) adheres to the outer side of the concave roller (6), and the inner paper (11) adheres to the outer side of the round roller (7). The outer paper (12) and the inner paper (11) approach and abut to each other. Therein, before the outer paper (12) abuts on the inner paper (11), they need to be glue coated with a glue coating machine. Specifically, the gluing head is located above the gap between the concave roller (6) and the round roller (7), and glue coat the opposite sides of the outer paper (6) and the inner paper (11) simultaneously. The sides of both outer paper (12) and the inner paper (11) have glue coating before they abut on each other. Then they are bonded under force, allowing the outer paper (12) and the inner paper (11) to have a relatively high connection strength and stability. Hence, the supporting strength and anti-scald effect of the cup body is provided. The amount of the glue usage, when bonding through glue coating is selected, determines the connection strength between the outer paper (12) and the inner paper (11). Excessive glue results in overflow of the glue and waste of the glue, while inadequate glue results in insufficient connection strength. Therefore, in this embodiment, the amount of glue usage is 10 grams per square meter. Of course, during the actual manufacturing process, when the outer paper (12) is bonded to the inner paper (11) through glue coating, the amount of glue usage may be 5 grams per square meter or 15 grams per square meter.

Sixth Embodiment

Figure 7:
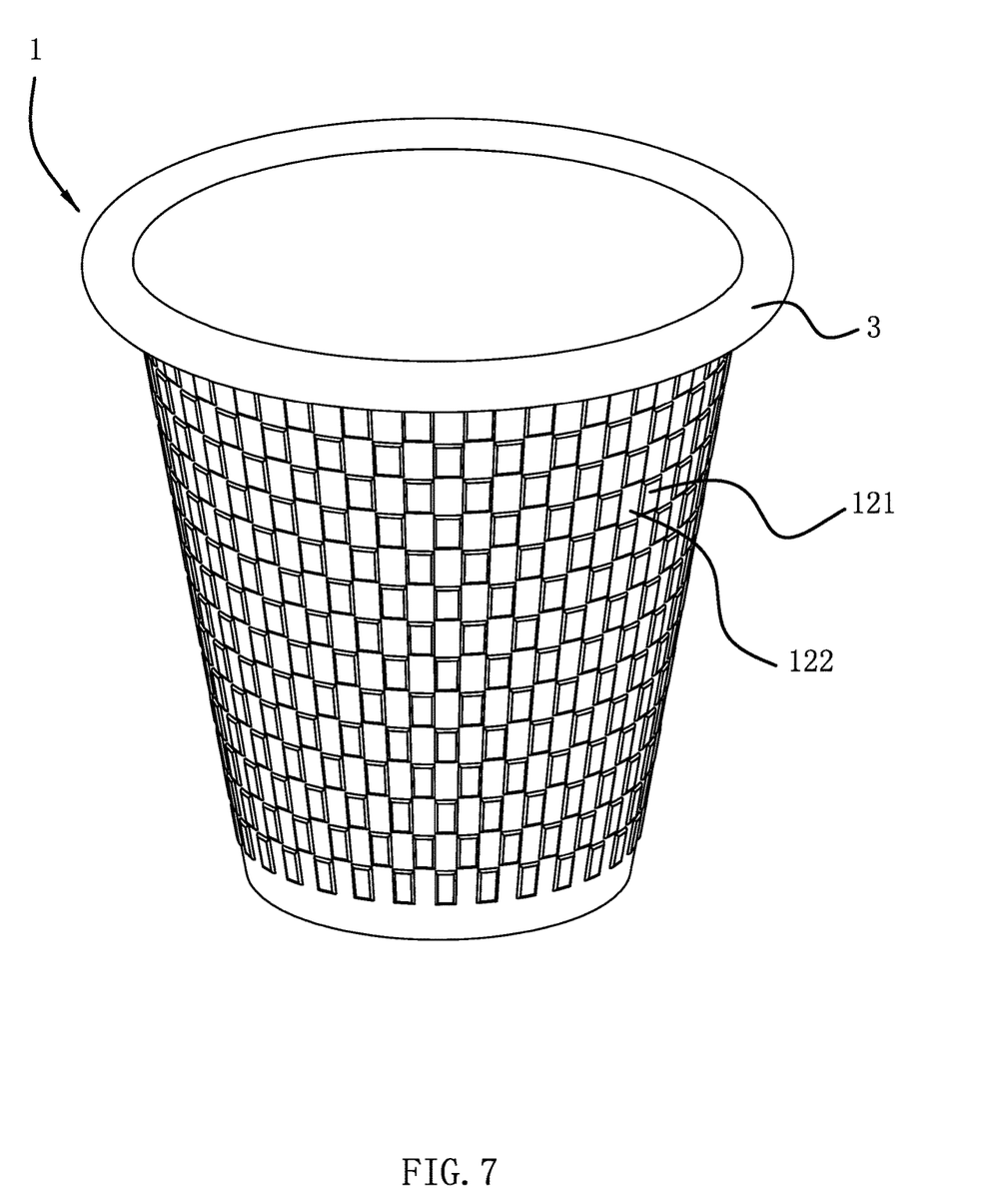
FIG. 7 is a cup face design in the Sixth Embodiment.

As shown in FIG. 7, the Sixth Embodiment is a paper cup having a special decorative design which employs the same structure and manufacturing process as those in the First Embodiment. The differences are:

The decorative pattern of the cup face is not annular and is, instead, formed by block shaped connecting parts 122 and a plurality of connecting parts 122 are arranged on the outer surface of the paper cup to form the decorative pattern; The width of the connecting parts 122 are 1 mm to 12 mm, and in this example, the best is 6 mm. This structure is not only able to provide an anti-scald effect but also a good strength, while using a relatively thin inner paper 11 and outer paper 12.

The description of the preferred embodiments thereof serves only as an illustration of the spirit of the invention. It will be understood by those skilled in the art that various changes or supplements in form and details may be made therein without departing from the spirit and scope of the invention as defined by the appended claims.

Although the terms of Inner paper (11), Outer Paper (12), Hollow Bulges (121) and etc. are often used herein, it does not exclude the possibility to use any other terms. Using such terms is only to describe or explain the nature of the present invention more conveniently. Any additional restrictions are contrary to the spirit of the present invention.

LIST OF REFERENCE NUMERALS

1 Cup Body
11 Inner Paper
12 Outer Paper
121 Hollow Bulge
122 Connecting Part
2 Cup Sheet
3 Crimping
4 Cup Bottom
41 Supporting Flange
5 Convex Roller
6 Concave Roller
7 Round Roller
8 Spraying Head
9 Double Layered Paper

What is claimed is:

1. A paper cup comprising:
a cup body (1) having exactly two layers, an inner paper (11) and an outer paper (12) both of which are single layered;
hollow bulges (121) on the outer paper (12), the hollow bulges (121) project outward and are capable of preventing scalding;
connecting parts (122) formed at the outer paper (12) located in between two adjacent hollow bulges (121); and
a cup bottom (4) fixed to a bottom part of the cup body (1);
wherein a cup rim of the outer paper (12) extends to a cup rim of the inner paper (11) and a double layered crimping (3) is formed by bending outward both cup rims of the outer paper (12) and the inner paper (11);

wherein an outer side of the hollow bulges (121) and connecting parts (122) of the outer paper (12) forms an outer surface of the cup body (1); and wherein each of the connecting parts (122) bonds to an outer side of the inner paper (11).

2. The paper cup of claim 1 wherein the connecting part (122) is in an annular or a continuous strip shape; and wherein a width of the connecting part (122) is 4 mm-12 mm.

3. The paper cup of claim 2 wherein weights of the outer paper (12) and the inner paper (11) are both 100 grams per square meter to 170 grams per square meter.

4. The paper cup of claim 1 wherein an outer rim of the cup bottom (4) bends downward to form a supporting flange (41);

wherein a bottom rim of the cup body (1) bends inward; and wherein an inner side of the inner paper (11) bonds to an inner side of the supporting flange.

5. The paper cup of claim 1 wherein the connecting part (122) is in a form of a strip or a block; and wherein a plurality of connecting parts (122) is arranged on an outer side surface of the paper cup to form a decorative design.

6. The paper cup of claim 5 wherein the connecting part (122) has a width of 1 mm to 12 mm.

* * * * *